A. PESTEL.
MECHANISM FOR RELEASING EXCESSIVE STRAINS.
APPLICATION FILED FEB. 9, 1920.
1,410,717.
Patented Mar. 28, 1922.
2 SHEETS—SHEET 1.
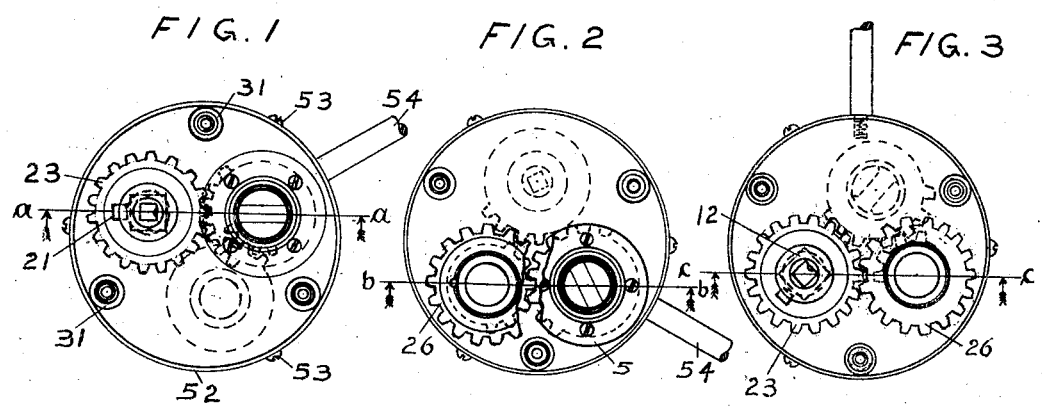
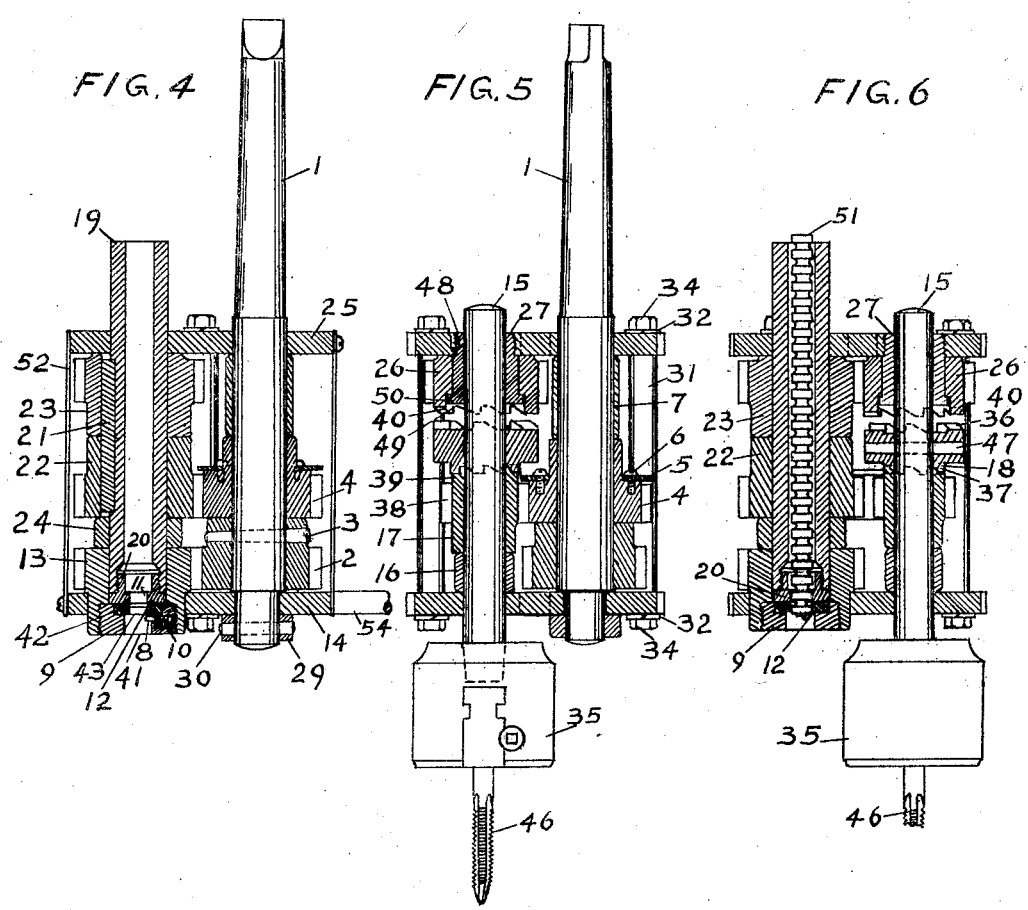
INVENTOR
Arthur Pestel.

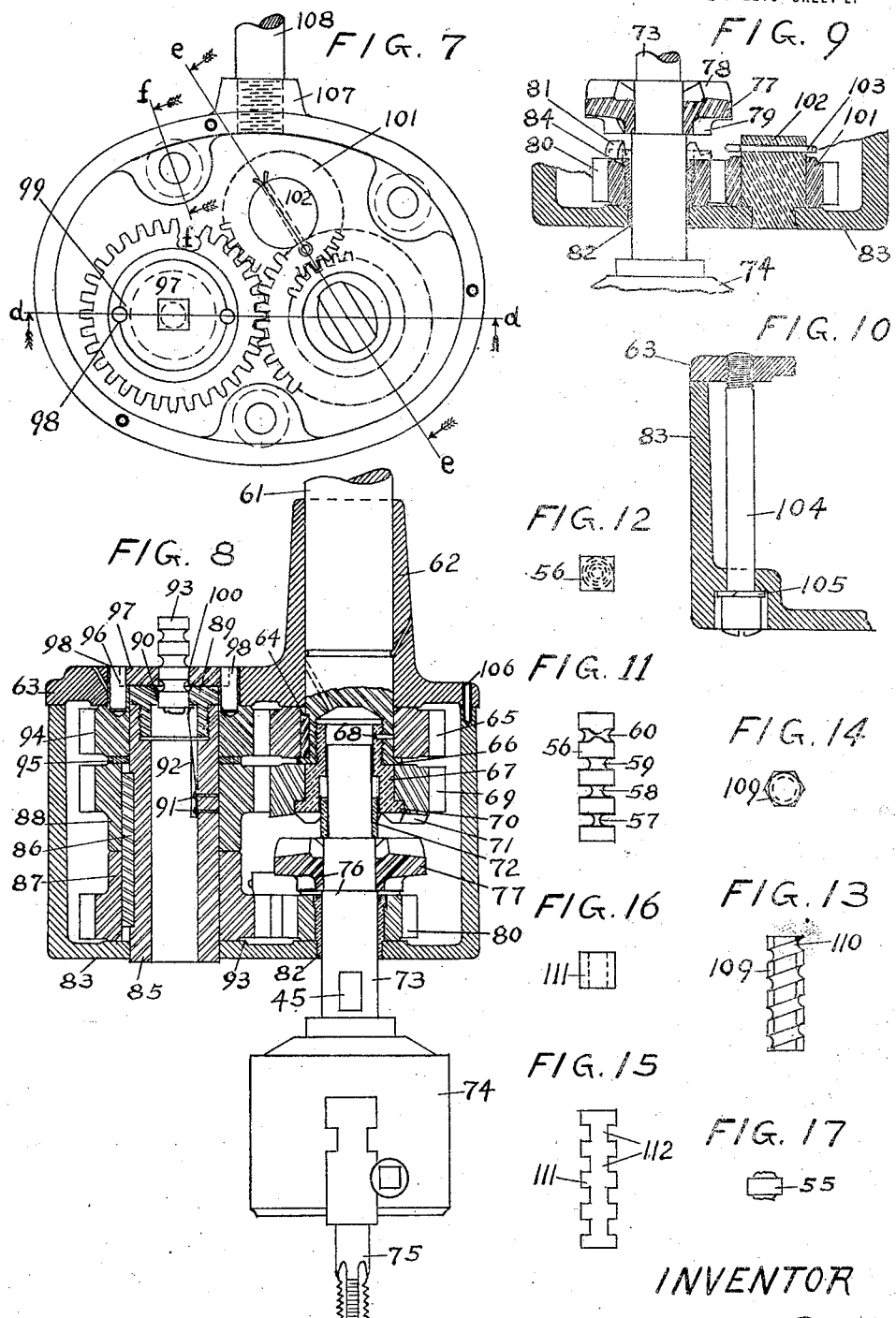

UNITED STATES PATENT OFFICE.

ARTHUR PESTEL, OF NEW YORK, N. Y.

MECHANISM FOR RELEASING EXCESSIVE STRAINS.

1,410,717.  Specification of Letters Patent.  Patented Mar. 28, 1922.

Application filed February 9, 1920. Serial No. 357,490.

*To all whom it may concern:*

Be it known that I, ARTHUR PESTEL, a citizen of the United States, residing at New York, county and State of New York, have invented certain new and useful Improvements in Mechanism for Releasing Excessive Strains, of which the following is a full, clear, and exact specification.

This invention relates to improvements in mechanism for releasing excessive strains and is applicable to different forms of mechanism in which release of excessive strains on machine elements is desired.

The object of my invention is to provide a mechanism which will eliminate breaking taps, drills and other work-performing elements and whereby a breakpin is inserted between two movable elements which pin will break, whenever the strain on said work performing element becomes too great.

My invention may be adapted for different mechanism for releasing excessive strains, but I desire to especially apply the same in connection with tapping and drilling mechanism.

In the accompanying drawings:—Figs. 1, 2 and 3, are plan views of a tapping and drilling mechanism with the cover removed. Certain gears are shown in dotted lines to make the views clearer.

Fig. 4 is a section on the line *a—a* Fig. 1.
Fig. 5 is a section on the line *b—b* Fig. 2.
Fig. 6 is a section on the line *c—c* Fig. 3.
Fig. 7 shows a plan view of a modified design of Figs. 1, 2, 3, 4, 5 and 6 cover removed.
Fig. 8 is a section on the line *d—d*, Fig. 7.
Fig. 9 is a partial section on the line *e—e* Fig. 7. Fig. 10 is a section on the line *f—f* Fig. 7.
Fig. 11 is a view of one form of breakpin, Fig. 12 is a topview of same. Fig. 13 is a modified view of Fig. 11. Fig. 14 is a top view of Fig. 13. Fig. 15 is another modified view of Fig. 11. Fig. 16 is a top view of Fig. 15. Fig. 17 is a view of a link, broken off from a breakpin.

Referring to Figs. 1, 2, 3, 4, 5 and 6, No. 1 indicates the driving shaft of the mechanism, rotatable between two plates, 25 and 14, and held at its lower end by a collar 29, secured to said shaft by a pin 30.

The plates 25 and 14 are kept in position by three spacing posts 31 and held together by screws 34, resting on lock-washers 32.

The driving shaft 1, has fast to it a driving gear 2, this gear being secured in position by a pin 3. An idler gear 4, freely rotatable on shaft 1, has mounted on its larger upper surface a ring 5, held to same by screws 6. 7 indicates a spacing tube and serves the purpose to retain gear 4 in its desired position.

In the construction illustrated, 15 indicates the chuck-spindle, having secured to its lower end a chuck 35, which has fast to it a tap 46.

Secured to chuckspindle 15 is a clutchcollar 18, held in position by means of pin 47, Fig. 6. The clutch-collar is formed with an upper clutchface 36 and a lower clutchface 37. Lower clutchgear 17, which is freely rotatable on spindle 15 and in mesh with gear 4, is indicated to ride on a collar 16 and prevented from being raised by means of ring 5, which overlaps teeth 38 of gear 17. The upper end of gear 17, has a clutchface 39.

In the particular construction is shown an upper clutch-gear 26, mounted to upper plate 25 by means of a bearing 27, screwed into plate 25 and locked thereto with a small screw 48.

Gear 26, which is freely rotatable on bearing 27, has in its lower surface a socket 49 riding on a flange 50 of bearing 27. The outer lower surface of gear 26 is shown to have a clutch surface 40.

In this construction is further indicated a hollow magazine spindle 19, which serves the purpose of housing a breakpin 51, Fig. 6. Securely fastened to said spindle are two gears 23 and 22, held in position by means of a key 21. Said gears and spindle are shown resting on a spacing collar 24, which in turn rests on a gear 13, which is resting on plate 14 and rotatably mounted therein.

Screwed into the lower end of gear 13 is shown a plug 9, with a hole 41 in its centre. Said plug has on its upper end a square socket 42, retaining therein a square shaped steel-plate or coupling member 12, which has in its centre a square hole 43, Fig. 4, large enough to allow breakpin 51, Fig. 6, to pass freely. Underneath plate 12, movable in plug 9, is indicated a snap-pin 8, Fig. 4, pressed toward the centre of the plug by a spring 10.

On the lower end of magazine spindle 19, is illustrated another coupling member 20, screwed into the spindle and having in its centre, similar to plate 12, a square hole 11.

The mechanism as shown, is enclosed into a casing 52, and held to plates 14 and 25, by means of screws 53. In the interest of clearness casing 52, is not shown in Figs. 5 and 6.

Fast in lower plate 14, is a rod 54, which serves the purpose to prevent the complete mechanism from turning. The operation of the mechanism is as follows: Driving gear 2, rotates gear 13, which by means of its coupling member 12, breakpin 51, Fig. 6 and coupling member 20 rotates spindle 19, with gears 22 and 23. Gear 23 rotates gear 26 and gear 22 rotates idler gear 4, which in turn rotates clutchgear 17. The whole mechanism is fastened in the spindle of a drill-press, lathe or other suitable machine by means of the driving spindle 1. The clutch-collar being in contact with gear 26, the chuckspindle, chuck and tap are revolved right-handed, while the gears 22, 4 and 17, run idly. The spindle of the drill-press is lowered or moved to carry the tap into the work until its stop is reached. Then the spindle of the drill-press is moved back and the driving spindle 1, plates 14 and 25, and all gears are drawn back, thereby throwing the clutch-collar 18 into contact with lower clutchgear 17, whereupon, owing to the continued rotating of the spindle, a reverse motion will be imparted through the gear to the chuck and tap to withdraw the latter from the work. Owing to the relative sizes of the gears 22, 4 and 17, the tap will be withdrawn or backed out of the work more quickly as in the forward or tapping motion.

Should the strain on the tap be too great, which may be caused by either having the taphole too small or having a dull and worn-out tap or a hard spot in the work, the breakpin 51, which is made of any suitable material, will break first at its smallest cross-section.

This will stop both spindles 19 and 15 as well as all gears, except gears 2 and 13, from rotation and thus save the tap from breaking.

The breakpin may then again be pushed in a coupling position far enough until it rests on snap-pin 8, at the same time ejecting a broken off link which in appearance is similar to that shown at 55, Fig. 17. The cross section of the breaking points of the breakpin are usually of the same size for one size tap and in a number of cases are most conveniently found by experiment.

To do that, a breakpin is made similar to that of breakpin 56, Figs. 11 and 12 here shown in exaggerated form which has different sized, cross-section at its respective breaking points, 57, 58, 59, and 60.

In the particular construction illustrated in Figs. 7, 8, 9, and 10, driving shaft 61 is rotatable in bearing 62 of cover 63 and has on its lower end securely locked with a key 64 driving gear 65 resting on a flange 66 of shaft 61. Bushing 67 which is screwed into shaft 61 and locked with a pin 68, carries an upper clutch gear 69 freely rotatable on said bushing 67. Gear 69, which is riding on flange 70, of bushing 67, has on its lower surface a clutchface 71.

A bearing collar 72, loosely fitting in bushing 67 as well as clutchspindle 73, serves the purpose of eliminating friction when clutchspindle 73 is rotating in the opposite direction from that of the driving spindle as well as bushing 67. Fast to the chuckspindle is chuck 74, holding a tap 75. Shrunk onto the shoulder 76 of the chuckspindle is a clutch-collar 77, which has an upper clutchface 78 and a lower clutchface 79. Lower clutchgear 80 which has a clutchface 81, Fig. 9, is freely rotatable on bushing 82, driven into casing 83, having on its upper end a flange 84, which serves the purpose to prevent gear 80 from being raised. Hollow spindle 85 has securely fastened with a key 86, two gears, 87 and 88, and screwed into its upper end a coupling member 89, having in its centre a square hole 90. To the inside of hollow spindle 85, is fastened with two rivets 91, a spring 92, which acts as positioner of breakpin 93. The hollow spindle at its lower end is rotatable in casing 83, and is carried by gear 87 resting on a boss 93, of said casing.

In the construction illustrated, the coupling gear 94, which is riding on a spacing ring 95, is freely rotatable in cover 63 and has on its upper end fitted into a socket 96 a coupling member 97 which is prevented from rotating by means of two pins 98, fast in gear 94, and two nicks 99, in coupling member 97. In the centre of coupling member 97 is provided a square hole, 100, large enough to allow breakpin 93, to pass freely.

The arrangement of the coupling members as shown has the advantage, that the member 97 may be lifted out and member 89 unscrewed from spindle 85 with any suitable wrench, fitting in hole 90. These members may then be interchanged with other coupling members having a larger or smaller sized hole to fit a larger or smaller sized breakpin respectively, thus giving the mechanism a much wider range of adaptability.

Idler gear 101, Figs. 7 and 9, is freely rotatable on bearing-pin 102, fast to casing 83, and prevented from being lifted by means of pin 103, in bearing-pin 102.

Cover 63 is fastened to casing 83, by means of three screws 104, Figs. 7 and 10, and lockwashers 105, in manner shown. Steady pins 106, Figs. 7 and 8 serve the purpose to securely lock the cover 63 to casing 83, to prevent it from being shifted. Fast in hub 107 of casing 83 is a rod 108, which prevents the complete mechanism from turning when in operation.

In the construction illustrated, driving gear 65 rotates coupling gear 94 which by means of its coupling member 97, breakpin 93 and coupling member 89 rotates hollow spindle 85, with gears 87 and 88. Gear 88 rotates upper clutchgear 69, and gear 87 rotates idler gear 101 which in turn rotates lower clutchgear 80.

The operation of the mechanism described last, is exactly alike to that illustrated in Figs. 1, 2, 3, 4, 5 and 6. The differences between the two mechanisms, consists mainly in the displacement of the chuckspindle 73, Figs. 7 and 8, which here is shown in line with driving spindle 61 and the modified arrangement of the breakpin coupling device illustrated to be on top instead of the lower end of the hollow spindle.

The arrangement shown in the modified design is considered preferable to the other, for the reason, that the coupling device is more accessible for the operator. It is understood however, that I do not limit myself to the precise forms of the mechanism as shown and that I hold myself at liberty to make such changes and alterations as fairly fall within the scope of my invention.

While the devices as illustrated and described in the specifications refer particularly to tapping and drilling mechanism, it is understood, that, the coupling mechanism with the accompanying breakpin, may be used in connection with other machines, requiring mechanism for the release of excessive strains.

It is also understood that in the mechanism shown in Figs. 7, 8 and 9 the clutch devices may be eliminated and the chuck 74, directly connected with an extended hollow spindle 85. In such a case the spindle would have at its lower end a hole or slot 45, Fig. 8, large enough to allow link 55, Fig. 17, to be ejected.

It is further understood that I do not limit myself to the precise forms of the breakpins and that I may use pins or rods which may be octagon or hexagon as illustrated at breakpin 109, Fig. 14 or formed in any other suitable manner.

It is also understood that instead of a number of grooves, only one continuous groove, as shown at 110 of breakpin 109, Fig. 13, may be employed, or that slots may be employed in a breakpin, similar to those shown at 112, of breakpin 111, Figs. 15 and 16 and that in the following claims whenever the word "indentation" is applied, it is meant to express the meaning that the breakpin may have either slots, notches, grooves or other marks, cut or pressed, on its body.

It is further understood that whenever the word "breakpin" appears, it is meant to be a device which will break before the workperforming element will be spoiled or demolished, i. e., a safety device which will prevent the ruination of the workperforming element.

I claim:

1. In a mechanism for releasing excessive strains, a driving spindle, a driving gear, fast to said spindle, a coupling gear, driven by said driving gear, a coupling member connected with said coupling gear, said coupling member being detachable from said coupling gear, an intermediate coupling member, a hollow spindle, rotatable with said coupling gear, a coupling member, connected with said hollow spindle, said coupling member being detachable from said hollow spindle, an indentation or indentations, in said intermediate coupling member, said intermediate member connecting said gear and spindle coupling members, said gear and spindle coupling members being adapted to transmit a torsional strain to said intermediate coupling member, a positioner, locating said intermediate member, a gear or gears on said hollow spindle and a clutch-device driven by said gear or gears.

2. In a mechanism for releasing excessive strains, a driving spindle, a driving gear, fast to said spindle, a coupling gear, driven by said driving gear, a coupling member connected with said coupling gear, an intermediate coupling member, a hollow spindle, rotatable with said coupling gear, a coupling member connected with said hollow spindle, an indentation or indentations in said intermediate coupling member, said intermediate member connecting said gear and spindle coupling members, said gear and spindle coupling member being adapted to transmit a torsional strain to said intermediate coupling member, a positioner, locating said intermediate member, a gear or gears on said hollow spindle and a clutch-device driven by said gear or gears.

3. In a mechanism for releasing excessive strains, a driving spindle, a driving gear, fast to said spindle, a coupling gear, driven by said driving gear, a coupling member, connected with said coupling gear, said coupling member being detachable from said coupling gear, an intermediate coupling member, a hollow spindle, rotatable with said coupling gear, a coupling member, connected with said hollow spindle, said coupling member being detachable from said hollow spindle, said intermediate member connecting said gear and spindle coupling members, said gear and spindle coupling members being adapted to transmit a torsional strain to said intermediate coupling member, a positioner, locating said intermediate member, a gear or gears on said hollow spindle, and a clutch-device driven by said gear or gears.

4. In a mechanism for releasing excessive strains, a driving spindle, a driving gear, fast to said spindle a coupling gear, driven by said driving gear, a coupling member connected with said coupling gear, an intermediate coupling member, a hollow spindle, rotatable with said coupling gear, a coupling member, connected with said hollow spindle, said intermediate member connecting said gear and spindle coupling members, said gear and spindle coupling members being adapted to transmit a torsional strain to said intermediate coupling member, a positioner, locating said intermediate member, a gear or gears on said hollow spindle and a clutch-device driven by said gear or gears.

5. In a mechanism for releasing excessive strains, a driving spindle, a driving gear, fast to said spindle, a coupling gear, driven by said driving gear, a coupling member connected with said coupling gear, said coupling member being detachable from said coupling gear, an intermediate coupling member, a hollow spindle, rotatable with said coupling gear, a coupling member connected with said hollow spindle, said coupling member being detachable from said hollow spindle, an indentation or indentations, in said intermediate coupling member, said intermediate member connecting said gear and spindle coupling members, a positioner, locating said intermediate member, a gear or gears on said hollow spindle and a clutch-device driven by said gear or gears.

6. In a mechanism for releasing excessive strains, a driving spindle, a driving gear, fast to said spindle, a coupling gear, driven by said driving gear, a coupling member connected with said coupling gear, an intermediate coupling member, a hollow spindle, rotatable with said coupling gear, a coupling member connected with said hollow spindle, an indentation or indentations in said intermediate coupling member, said intermediate member connecting said gear and spindle coupling members, a positioner, locating said intermediate member, a gear or gears, on said hollow spindle and a clutch-device driven by said gear or gears.

7. In a mechanism for releasing excessive strains, a driving spindle, a driving gear, fast to said spindle, a coupling gear, driven by said driving gear, a coupling member connected with said coupling gear, said coupling member being detachable from said coupling gear, an intermediate coupling member, a hollow spindle, rotatable with said coupling gear, a coupling member connected with said hollow spindle, said coupling member being detachable from said hollow spindle, said intermediate member connecting said gear and spindle coupling members, a positioner, locating said intermediate member, a gear or gears on said hollow spindle, and a clutch-device driven by said gear or gears.

8. In a mechanism for releasing excessive strains, a driving spindle, a driving gear, fast to said spindle, a coupling gear, driven by said driving gear, a coupling member connected with said coupling gear an intermediate coupling member a hollow spindle, rotatable with said coupling gear, a coupling member connected with said hollow spindle, said intermediate member connecting said gear and spindle coupling members, a positioner, locating said intermediate member, a gear or gears on said hollow spindle and a clutch-device driven by said gear or gears.

9. In a mechanism for releasing excessive strains, a driving member, a breakpin, formed by a plurality of indentations displaced in a lengthwise direction, a driven member, and means connecting said driving member and said driven member with said breakpin.

10. In a mechanism for releasing excessive strains, a driving member, a breakpin, formed by a plurality of indentations, displaced in a length-wise direction, a driven member, a workperforming element, means for fastening said element to said driven member, and means connecting said driving member and said driven member with said breakpin.

11. In a mechanism for releasing excessive strains a driving member, a breakpin, a driven member, a workperforming element, means for fastening said element to said driven member, and means connecting said driving member and said driven member with said breakpin, said means being adapted to transmit a torsional strain to said breakpin.

12. In a mechanism for releasing excessive strains, a driving member, a breakpin, an indentation or indentations, in said breakpin, a driven member, a workperforming element, means for fastening said element to said driven member, and means connecting said driving member and said driven member with said breakpin, said means being adapted to transmit a torsional strain to said breakpin.

13. In a mechanism for releasing excessive strains, a driving member, a breakpin, a plurality of indentations displaced in a lengthwise direction on said breakpin, a driven member, coupling members on said driving member and said driven member, said breakpin being slidable in said coupling members.

14. In a mechanism for releasing excessive strains, a driving member, a breakpin, formed by a plurality of indentations, displaced in a lengthwise direction, a driven member, a workperforming element, means for fastening said element to said driven member and coupling members on said driving member and said driven member, said breakpin being slidable in said coupling members.

15. In a mechanism for releasing excessive strains, a driving member, a breakpin, a driven member, a workperforming element, means for fastening said element to said driven member and coupling members on said driving member and said driven member, said breakpin being slidable in said coupling members, said coupling members being adapted to transmit a torsional strain to said breakpin.

16. In a mechanism for releasing excessive strains, a driving member, a breakpin an indentation or indentations, in said breakpin, a driven member a workperforming element, means for fastening said element to said driven member and coupling members on said driving member and said driven member, said breakpin being slidable in said coupling members, said coupling members being adapted to transmit a torsional strain to said breakpin.

17. In a mechanism for releasing excessive strains, a driving member, a breakpin, consisting of a plurality of definitely spaced links formed by indentations, a driven member, a workperforming element, means for fastening said element to said driven member, and means connecting said driving member and said driven member with said breakpin.

18. In a mechanism for releasing excessive strains, a driving member, a breakpin, consisting of a plurality of definitely spaced links, formed by indentations, a driven member, a workperforming element, means for fastening said element to said driven member and means connecting said driving member and said driven member with said breakpin, said means being adapted to transmit a torsional strain to said breakpin.

19. In a mechanism for releasing excessive strains, a driving member, a breakpin consisting of a plurality of definitely spaced links formed by indentations, a driven member, a workperforming element, means for fastening said element to said driven member and coupling members on said driving member and said driven member, said breakpin being slidable in said coupling members.

20. In a mechanism for releasing excessive strains, a driving member, a breakpin, consisting of a plurality of definitely spaced links formed by indentations, a driven member, a workperforming element, means for fastening said element to said driven member and coupling members on said driving member and said driven member, said breakpin being slidable in said coupling members, said coupling members being adapted to transmit a torsional strain to said breakpin.

21. In mechanism for releasing excessive strains, a driving member, a breakpin composed of a plurality of links formed by indentations on said pin, a driven member and means connecting said driving and driven member with said pin.

Signed at New York, in the county of New York and State of New York, this seventh day of February A. D. 1920.

ARTHUR PESTEL.

Witnesses:
LEONARD GREENBURG,
HELENE BERGER.